United States Patent
Grinewitschus et al.

[11] Patent Number: 6,005,361
[45] Date of Patent: Dec. 21, 1999

[54] METHOD FOR CONTROLLING A DIRECT CURRENT DRIVE

[75] Inventors: Viktor Grinewitschus, Wesel; Dirk Raffel, Duisburg, both of Germany

[73] Assignee: Fraunhofer-Gesellschaft zur Fóderung der Angewandten Forschung e.V., Germany

[21] Appl. No.: 09/117,051

[22] PCT Filed: Dec. 27, 1996

[86] PCT No.: PCT/EP96/05850

§ 371 Date: Jul. 13, 1998

§ 102(e) Date: Jul. 13, 1998

[87] PCT Pub. No.: WO97/26694

PCT Pub. Date: Jul. 24, 1997

[30] Foreign Application Priority Data

Jan. 16, 1996 [DE] Germany ............ 196 01 359

[51] Int. Cl.$^6$ ............................................. G05B 5/00
[52] U.S. Cl. .................. 318/469; 318/490; 318/430; 318/432; 318/445; 318/474
[58] Field of Search .............................. 318/469, 490, 318/430, 432, 445, 474

[56] References Cited

U.S. PATENT DOCUMENTS

| | | | |
|---|---|---|---|
| 4,141,244 | 2/1979 | Dumbeck | 318/490 |
| 4,394,605 | 7/1983 | Terazawa | 318/280 |
| 5,111,148 | 5/1992 | Senoo et al. | 318/490 |
| 5,180,923 | 1/1993 | Tyler | 290/40 |
| 5,334,876 | 8/1994 | Washeleski et al. | 307/10.1 |
| 5,418,440 | 5/1995 | Sakaguchi et al. | 318/560 |
| 5,623,104 | 4/1997 | Suga | 73/862.18 |

FOREIGN PATENT DOCUMENTS

| | | | |
|---|---|---|---|
| 0 692 856 | 1/1996 | European Pat. Off. | H02H 7/085 |
| 0 714 052 | 5/1996 | European Pat. Off. | G05B 19/4062 |
| 40 00 730 | 1/1990 | Germany | F16P 3/12 |
| 92 02 631 | 2/1992 | Germany | E05F 15/20 |
| 42 14 998 | 5/1992 | Germany | E05F 15/20 |
| 43 12 865 | 4/1993 | Germany | E05F 15/20 |
| 43 33 675 | 10/1993 | Germany | H02P 7/00 |

*Primary Examiner*—Karen Masih
*Attorney, Agent, or Firm*—Dougherty & Associates

[57] ABSTRACT

In a method of controlling a direct-current drive, in particular a direct-current door drive, two state variables of the direct-current drive are determined and, on the basis of these state variables, a load or resistance moment applied to the direct-current drive is determined and compared with a predetermined load or resistance moment. Subsequently, it is established that an abnormal situation exists when the load or resistance moment determined exceeds the predetermined load or resistance moment.

10 Claims, 5 Drawing Sheets

METHOD FOR CONTROLLING A DIRECT CURRENT DRIVE

BACKGROUND OF THE INVENTION

1. Field of the Invention

The present invention refers to a method of controlling a direct-current drive, in particular a direct-current door drive.

2. Description of Related Art

The safety requirements which are to be met by the control of direct-current drives, used e.g. for opening and closing doors, garage doors, electric sliding roofs and the like, are very high. These safety requirements include the recognition of dangerous situations. If there is an obstacle in the path of movement of the element to be actuated, e.g. a garage door, switching off or reversing of the door must be initiated immediately. To avoid damage and injuries, the external forces acting on the door edge in the case of such switching off or reversing must not exceed specific limit values. Such limit values are prescribed by the legislator. In addition, it is endeavoured to keep the forces actually occurring as low as possible by special methods.

In the methods for controlling direct-current drives known from the prior art, the motor current applied to the direct-current drive is compared with an absolute limit value or with detected reference values.

In a first known method for controlling a direct-current drive, the motor current is compared with an absolute, predetermined, constant limit value. As soon as the instantaneous motor current exceeds a predetermined absolute value, the direct-current drive will be switched off. The disadvantage of this first known method is that the maximum driving power is strongly limited. A further problem entailed by this known method arises when the force required by a door depends strongly on the door position. In this case, positions exist at which the force at the door edge may exceed the admissible values without switching off of the direct-current drive being caused.

In order to avoid the problems described hereinbefore, a second method, which is known in the prior art, was developed; this method is known from DE 4214998 A1 and includes the step of comparing the motor current, which is applied to the direct-current drive, with a current determined by a learning trip in dependence upon the door position. In this method, which is based on reference measurements, the necessary motor current or the target speed is measured for various positions during an undisturbed trip of the door and stored as a reference value. Inadmissible deviations from the stored reference values will then result in switching off during subsequent trips. This known method is, however, problematic insofar as in cases in which a door is stopped between the end points of a trip (the point at which the door is closed or the point at which the door is open) and then started again, a high starting current will occur when the door is being re-started. For this high starting current at a position between the two end points, reference values do not exist. In order to avoid switching off or reversal of the door in this case, higher limit values for an admissible operation of the door must be provided in dependence upon the respective case of use when this method is employed. Another possibility of preventing the limit values from being exceeded is to disable the supervision during the starting period.

The above-mentioned problem arising when a door is being restarted after a stop at a position between the two end positions is clearly shown on the basis of a graph represented in FIG. 5. As can be seen from FIG. 5, the necessary motor current is there plotted against the position of a door. More precisely, the necessary motor current is plotted against the range between the door being opened and closed. Curve a) represents the motor current during a so-called normal trip. For this normal trip reference values were ascertained during the learning trip to which a predetermined tolerance value was added, whereby the limit value curve b) is obtained, which is shown in FIG. 5. Curve c) shows the problem which arises when the door was stopped at an arbitrary position between the two end positions and when it has to be re-started subsequently. In this case, the necessary motor current increases abruptly so that it would clearly exceed the limit value curve b). In order to avoid this problem, the limit value curve must be chosen such that, even if the door is re-started after having been stopped between the end positions, switching off of the direct-current drive by the high motor current occurring during re-starting can reliably be avoided. This, however, entails the problem that very high limit value curves b) must be chosen so that, in cases in which the door meets with an obstacle during its trip, switching off or reversing of the door will only be initiated after a comparatively long time. In one case, this may have the effect that the direct-current drive is damaged due to an excessive load applied thereon. In another, much more critical case, in which the above-mentioned obstacle is a human being, the switching off, which has been effected too late due to the higher limit values, may cause substantial injuries of the human body.

SUMMARY OF THE INVENTION

It is the object of the present invention to provide a method of controlling a direct-current drive which permits a reliable detection of disturbances on the basis of low limit values.

According to a first aspect, the present invention provides a method of controlling a direct-current drive, in particular a direct-current door drive, the method having the steps of a) detecting two state variables of the direct-current drive;

b) determining a load or resistance moment applied to the direct-current drive on the basis of the state variables detected in step a) and on the basis of parameters of the direct-current drive and of an element driven by the direct-current drive;

c) comparing the load or resistance moment determined with a predetermined load or resistance moment; and d) determining an abnormal situation when the load or resistance moment determined exceeds the predetermined load or resistance moment;

the load or resistance moment being determined according the following equation:

$$\overline{M_{W,ges}} \approx k_3 \phi \cdot \frac{1}{n} \sum_{i=1}^{n} I_A(\tau_i) - \theta_{L,ges} \cdot \frac{\omega_L(t_0 + T) - \omega_L(t_0)}{T}$$

wherein:

$M_{W,ges}$ .... mean load or resistance moment,
$k_3 \theta$ ....... motor constant,
$I_A$ ........ armature current,
$\theta_{L,ges}$ .... mass moment of inertia, and
$L$ ........ angular velocity According to a second aspect, the present invention provides a method of controlling a direct-current drive, in particular a direct-current door drive, the method having the steps of a) detecting two state variables of the direct-current drive;

b) determining a load or resistance moment applied to the direct-current drive on the basis of the state variables detected in step a) and on the basis of parameters of the direct-current drive and of an element driven by the direct-current drive;

c) comparing the load or resistance moment determined with a predetermined load or resistance moment; and d) determining an abnormal situation when the load or resistance moment determined exceeds the predetermined load or resistance moment;

the load or resistance moment being determined by solving the following differential equations:

$$k_2 \phi I_A = M^*_{W,ges} + \theta_{A,ges} \frac{\partial \omega_A}{\partial t}$$

$$U_A = R_A I_A + k_2 \phi \omega_A + L_A \frac{\partial I_A}{\partial t}$$

wherein:

$I_A$ ......... armature current,
$U_A$ ......... armature voltage,
$R_A$ ......... armature resistance,
$L_A$ ......... armature inductance,
$\omega_A$ ......... angular velocity,
$\theta_{A,ges}$ ..... mass moment of inertia,
$M^*_{W,ges}$ .... resistance moment,
$\Phi$ .......... magnetic flux of a single pole through the coils,
$k_3 \Phi$ ........ motor constant,
$k_2 \Phi I_A = M_I$ .. inner torque.

One advantage of the present invention is to be seen in the fact that it permits a reliable detection of disturbances already at much lower limit values, since the method according to the present invention works reliably also in cases in which the problems described hereinbefore arise when known methods are used.

Another advantage is to be seen in the fact that the load or resistance moment acting on the drive can be calculated exactly by means of an analytical, dynamic model on the basis of the characteristics, such as motor current and position, that can be detected at the direct-current drive. Inertia and friction effects occurring can thus be taken into account and compensated for, whereby the necessary threshold for recognizing an abnormal situation or a dangerous situation, such as blocking of the path of movement of a door, can be lowered substantially.

According to a further advantage of the present invention, the method according to the invention uses the motor current only as an auxiliary variable in combination with which further physical aspects are arithmetically taken into account, e.g. a position of a door and the speed as well as the acceleration of a door. It follows that by means of the method according to the present invention also the starting current after a stop of the door at a mid-position can be taken into account in a suitable manner, and this results in a higher operational reliability on the basis of lower set limit load values.

BRIEF DESCRIPTION OF THE DRAWINGS

In the following, preferred embodiments of the present invention will be explained in more detail making reference to the drawings enclosed, in which.

DESCRIPTION OF THE PREFERRED EMBODIMENTS

The basis of the method according to the present invention is that, by means of an analytical, dynamic model of a drive system, the load moment or resistance moment acting on the drive is calculated exactly on the basis of the characteristics that can detected at the direct-current drive. Inertia and friction effects occurring can thus be taken into account and compensated for, whereby the necessary threshold for the recognition of a dangerous situation caused by a blocked path of movement and occurring e.g. in the case of a garage-door drive can be lowered substantially.

Since the exact parameters of such a model are normally not known, it will be described in the following how these parameters can be determined with sufficient accuracy on the basis of a small number of learning trips. The information processing required for executing the method is normally carried out by the microcontrollers used in more recent drives for the purpose of control.

Since the above-mentioned microcontrollers only have a limited computing capacity, the method described hereinbelow is, consequently, also a method which is optimized with regard to a low necessary computing capacity.

In accordance with the method according to the present invention two state variables of the direct-current drive are detected in a first step and, subsequently, a load or resistance moment applied to the direct-current drive is determined. Following this, the load or resistance moment determined is compared with a predetermined load or resistance moment and an abnormal situation is established if the load or resistance moment determined exceeds the predetermined load or resistance moment.

Figure 1:
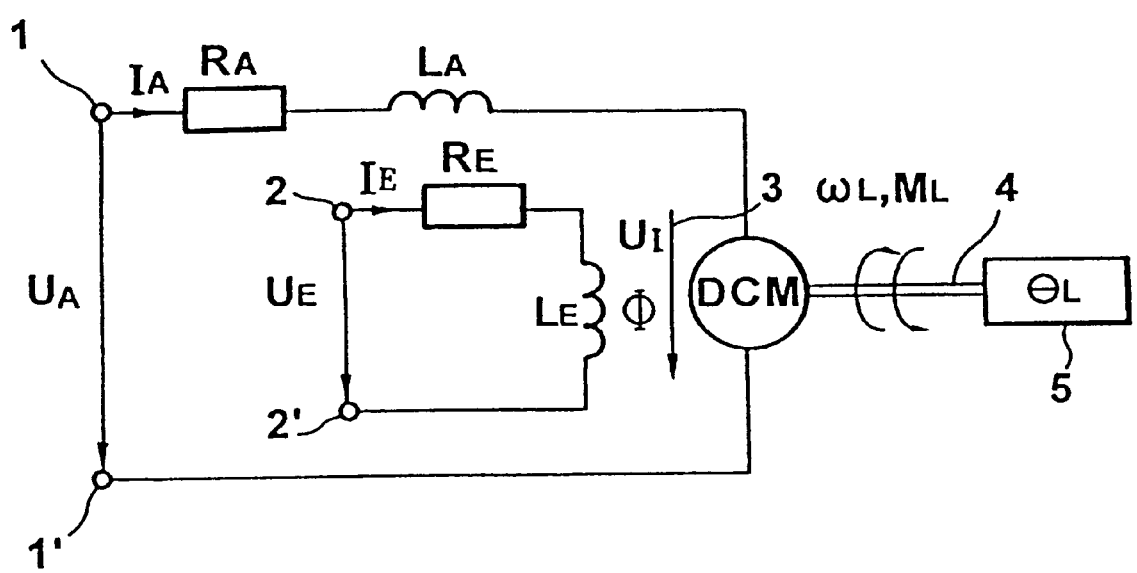
FIG. 1 shows an equivalent circuit diagram of a direct-current drive.

In the following, a preferred embodiment is described in detail and it is shown how the load or resistance moment acting on the direct-current drive is determined. In addition, it is explained how the state variables and parameters of the direct-current drive and of the element driven by the direct-current drive, which are required for determining the load or resistance moment, are determined. For determining the load or resistance moment acting on the direct-current drive, the present invention starts from the modelling of a drive system described hereinbelow. In FIG. 1, an electromechanical equivalent circuit diagram of a direct-current drive is shown. It is pointed out that the elements of the armature circuit are provided with index A, whereas the elements of the excitation circuit are provided with index E.

The armature circuit has two connecting terminals 1, 1' between which the armature voltage $U_A$ is applied. The connecting terminal 1 is connected via the resistor $R_A$ and the inductance $L_A$ to a connection of a direct-current motor DCM. The other connection of the direct-current motor is connected to the terminal 1' of the armature circuit. The current $I_A$ flows in the armature circuit.

The excitation circuit comprises two terminals 2, 2' between which the excitation voltage $U_E$ is applied. The resistor $R_E$ represents the resistance of the excitation winding, and the inductance $L_E$ represents the inductance of the excitation winding. The current $I_E$ flows in the excitation circuit.

$U_I$ (designated by arrow 3) represents the speed-dependent counterelectromotive force of the motor DCM.

The motor DCM comprises an output shaft 4 connected to a load 5. Normally, the load is connected to the motor via a transmission. The output shaft of the motor is referred to as drive shaft hereinbelow, and the output shaft of the transmission is referred to as driven shaft. $\omega_A$ stands for the number of revolutions of the drive shaft. $M^*_L$ represents the load moment calculated for the drive shaft and $\theta^*_L$ stands for the inertia moment of the load calculated for the drive shaft.

The differential equations for the excitation circuit and the armature circuit following hereinbelow can be derived from the equivalent circuit diagram of the direct-current drive shown in FIG. 1.

$$U_E = R_E I_E + L_E \frac{\partial I_E}{\partial t} \tag{1}$$

$$U_A = R_A I_A + L_A \frac{\partial I_A}{\partial t} + U_I \tag{2}$$

For the induced voltage $U_I$, the following equation is obtained:

$$U_I = \frac{z}{a} p n_a \phi = k_1 n_a \phi \tag{3}$$

wherein:

$n_A$=the number of revolutions of the drive shaft 4;
$\Phi$=the magnetic flux of a single pole through the coils;
z=the number of armature conductors;
a=the number of armature-winding paths;
b=the number of pole pairs.

Equation (3) can be reformulated as follows:

$$U_I = k_1 \frac{\omega_A}{2\pi} \phi = k_2 \omega_A \phi \tag{4}$$

In addition, the inner torque (air-gap moment) of the direct-current machine can be expressed by the following relationship:

$$M_I = k_2 \phi I_A \tag{5}$$

The differential equation of motion reads in a simplified form as follows:

$$M_I = M^*_{W,ges} + \theta_{A,ges} \frac{\partial \omega_A}{\partial t} \tag{6}$$

wherein $M_I$=inner torque (air-gap moment)
$M^*_{W,ges}$=resistance moment, related to the drive shaft
$\theta_{A,ges}$=whole mass moment of inertia, related to the drive shaft Including the correlation according to equation (5), the following equation is obtained:

$$k_2 \phi I_A = M^*_{W,ges} + \theta_{A,ges} \frac{\partial \omega_A}{\partial t} \tag{7}$$

Summarizing, the following set of differential equations is obtained, which describe the dynamic behaviour of a direct-current drive:

$$k_2 \phi I_A = M^*_{W,ges} + \theta_{A,ges} \frac{\partial \omega_A}{\partial t} \tag{8}$$

$$U_A = R_A I_A + k_2 \phi \omega_A + L_A \frac{\partial I_A}{\partial t} \tag{9}$$

$$U_E = R_E I_E + L_E \frac{\partial I_E}{\partial t} \tag{10}$$

When the stationary behaviour is considered, the direct-current drive can be described by the following equations:

$$k_2 \phi I_A = M^*_{W,ges} \tag{11}$$

$$U_A = R_A I_A + k_2 \phi \omega_A \tag{12}$$

$$U_E = R_E I_E \tag{13}$$

In the case of constantly separately excited direct-current motors, which are used for most drives, the considerations following hereinbelow result in a simplification of the above-described system of differential equations: for constantly separately excited direct-current motors, the excitation circuit is connected to a separate, independent direct-current source or the excitation is carried out by means of a permanent magnet. Hence, a constant magnetic flux $\theta$ can be assumed to exist, which is not influenced by variable load moments or electric control measures. For describing the stationary and dynamic behaviour of a constantly excited direct-current motor, a linear, analytically solvable system is therefore obtained on the basis of the two differential equations following hereinbelow:

$$k_2 \phi I_A = M^*_{W,ges} + \theta_{A,ges} \frac{\partial \omega_A}{\partial t} \tag{14}$$

$$U_A = R_A I_A + k_2 \phi \omega_A + L_A \frac{\partial I_A}{\partial t} \tag{15}$$

In the system of differential equations given above, the armature voltage $U_A$ and the resistance moment $M^*_{W,ges}$ represent the mathematical disturbance variables, the armature current $I_A$ and the angular velocity $\omega_A$ being the state variables of the system. The current resistance moment results from the solution of this system of differential equations making use of the variables $U_A$, $I_A$ and $\omega$ that can be detected directly at the motor.

For solving the system of differential equations determined by equations (14) and (15), the necessary parameters of the model have to be determined.

A first parameter is the motor constant $k_3\theta$ which is a direct characteristic of the motor. Hence, this parameter can be determined directly when the direct-current drive is being developed, and it can be used as a load-independent constant in the calculation. The starting point for the determination of the motor constant is the equation following hereinbelow for the inner torque of a direct-current machine:

$$M_I = k_2 \phi I_A \tag{16}$$

$$\Rightarrow \ddot{u} M_I = \ddot{u} k_2 \phi I_A = k_3 \phi I_A \tag{17}$$

wherein:
ü=transmission ratio of the transmission.

The formation of the partial derivative according to the armature current results in the following:

$$\frac{\partial}{\partial I_A} \ddot{u} M_I = k_3 \phi \tag{18}$$

$$\Rightarrow k_3 \phi = \frac{\partial(\ddot{u} M_I)}{\partial I_A} \approx \frac{\Delta(\ddot{u} M_I)}{\Delta I_A} \tag{19}$$

It follows that the motor constant for a given characteristic curve $I_A = f(M_I)$ can be quantitatively determined in a simple manner making use of the derived relationship according to equation (19).

The angular velocity is detected by means of a digital revolution measurement. For measuring the number of revolutions, an incremental position transducer can, for example, be used, which supplies a predetermined number of pulses per revolution. The pulse frequency $f_I$ can be determined in the manner shown hereinbelow:

$$T_L = k \cdot T_I \tag{20}$$

$$\Rightarrow f_L = \frac{1}{k} \cdot f_I \tag{21}$$

The occurrence of a pulse in the output signal of the incremental position transducer causes an interrupt in the micro-control. When the routine is suitably programmed to deal with this interrupt, these pulses can be summed up in a counter.

Counting in into the counter during the time $T_M$ results in the following equation for the number of pulses z:

$$z = \int_{t_0 - \frac{T_M}{2}}^{t_0 + \frac{T_M}{2}} f_I dt = k \int_{t_0 - \frac{T_M}{2}}^{t_0 + \frac{T_M}{2}} f_L dt = k T_M \overline{f_L} \tag{22}$$

with:

$$\overline{f_L} = \frac{1}{T_M} \int_{t_0 - \frac{T_M}{2}}^{t_0 + \frac{T_M}{2}} f_L dt \tag{23}$$

According to equation (23), $f_L$ represents the mean number of revolutions of the drive shaft of the motor in the interval $[t_0 - T_M/2, t_0 + T_M/2]$.

For the mean value of the angular velocity $\omega_L$, the following results from equation (22):

$$\overline{\omega_L} = 2\pi \overline{f_L} = 2\pi \cdot \frac{z}{k T_m} \tag{24}$$

As a further parameter, the mass moment of inertia of the element driven by the direct-current drive must be determined. The mass moment of inertia depends on the respective case of use, and must therefore normally be ascertained by learning trips of the drive.

For the whole whole mass moment of inertia $\theta_{A,ges}$, related to the drive shaft 4, the following holds true:

$$\theta_{A,ges} = \theta_{rotor} + \theta_L^r = \theta_{rotor} + \frac{1}{\ddot{u}^2} \theta_L \tag{25}$$

wherein ü is the transmission ratio of a transmission, and the index L designates the load-related term. The conversion with regard to the driven shaft, including the known correlation $$\theta_{A,ges} = \frac{1}{\ddot{u}^2} \theta_{L,ges} \tag{26}$$

results in $$\theta_{L,ges} = \ddot{u}^2 \cdot \theta_{rotor} + \theta_L \tag{27}$$

$\theta_{L,ges}$ stands for the whole mass moment of inertia related to the drive shaft. If, due to a large transmission ratio, the moment of inertia of the rotor transformed to the output side is much larger than the moment of inertia of the load, the latter can be neglected. If not, the moment of inertia is determined in the manner explained hereinbelow.

For ascertaining the parameter $\theta_{L,ges}$, which, according to the just derived relationship according to equation (27), shows in particular a dependence on the mass moment of inertia on the load side, a linear system of equations is formulated hereinbelow which starts from the relationship derived in equations (34)–(41).

$$k_3 \phi T \cdot \frac{1}{n} \sum_{i=1}^{n} I_A(\tau_i) = \overline{M_{W,ges}} T + \theta_{L,ges} \cdot [\omega_L(t_0 + T) - \omega_L(t_0)] \tag{28}$$

When equation (28) is taken into consideration hereinbelow for two different intervals $[t_1, t_1+T]$ and $[t_2, t_2+T]$, which are not specified in detail here, the following is obtained:

$$k_3 \phi T \cdot \frac{1}{n} \sum_{i=1}^{n} I_A(\tau_i) = \overline{M_{W,ges}} T + \theta_{L,ges} \cdot [\omega_L(t_1 + T) - \omega_L(t_1)] \tag{29}$$

with $t_1 = x_0 < x_1 < \ldots < x_n = t_1 + T$
and $x_{i-1} < \tau_i < x_i$ and $$k_3 \phi T \cdot \frac{1}{n} \sum_{i=1}^{n} I_A(\xi_i) = \overline{M_{W,ges}} T + \theta_{L,ges} \cdot [\omega_L(t_2 + T) - \omega_L(t_2)] \tag{30}$$

with $t_2 = y_0 < y_1 < \ldots < y_n = t_2 + T$
and $y_{i-1} < \xi_i < y_i$

To make the linear system of equations solvable, it is here assumed that the mean resistance moment is equal with regard to the two intervals. The unknown resistance moment can then be eliminated. Written in matrix notation, the system of equations can be formulated as follows:

$$k_3 \phi T \begin{bmatrix} \frac{1}{n}\sum_{i=1}^{n} I_A(\tau_i) \\ \frac{1}{n}\sum_{i=1}^{n} I_A(\xi_i) \end{bmatrix} = \begin{bmatrix} T & [\omega_L(t_1 + T) - \omega_L(t_1)] \\ T & [\omega_L(t_2 + T) - \omega_L(t_2)] \end{bmatrix} \cdot \begin{bmatrix} \overline{M_{W,ges}} \\ \theta_{L,ges} \end{bmatrix} \quad (31)$$

When Cramer's determinant rule is applied for solving the system of equations, the mass moment of inertia searched for is as follows:

$$\theta_{L,ges} = k_3 \phi \frac{\begin{bmatrix} \frac{1}{n}\sum_{i=1}^{n} I_A(\tau_i) \\ \frac{1}{n}\sum_{i=1}^{n} I_A(\xi_i) \end{bmatrix}}{\begin{bmatrix} T & [\omega_L(t_1 + T) - \omega_L(t_1)] \\ T & [\omega_L(t_2 + T) - \omega_L(t_2)] \end{bmatrix} \cdot \begin{bmatrix} \overline{M_{W,ges}} \\ \theta_{L,ges} \end{bmatrix}} \quad (32)$$

When the two determinants in equation (32) are solved in the manner known, the parameter $\theta_{L,ges}$ can be determined approximately according to the following equation:

$$\theta_{L,ges} \approx k_3 \phi \frac{\frac{1}{n}\sum_{i=1}^{n} I_A(\xi_i) - \frac{1}{n}\sum_{i=1}^{n} I_A(\tau_i)}{\frac{\omega_L(t_2 + T) - \omega_L(t_2)}{T} - \frac{\omega_L(t_1 + T) - \omega_L(t_1)}{T}} \quad (33)$$

For determining $\theta_{L,ges}$, one or several learning trips are carried out at the drive. On the basis of a comparison between an acceleration phase and a phase of uniform speed, the moment of inertia is obtained according to equation (33) from the measured motor current and from the acceleration determined by evaluating the pulses of the incremental position transducer.

The intervals $[t_1, t_1+T]$ and $[t_2, t_2+T]$ are determined during the learning trips in such a way that the mean resistance moments are identical with regard to the two intervals.

Due to the only limited computing capacity of the microcontrollers used, a numeric-iterative solution of the system of differential equations described hereinbefore is out of the question in most cases of use. In the following, a solution trial for solving the system of differential equations is described in which the relevant differential equation is reformulated into an integral equation.

The starting point is the following differential equation $$k_2 \phi I_A = M^*_{W,ges} + \theta_{A,ges} \frac{\partial \omega_A}{\partial t} \quad (34)$$

with $$M^*_{W,ges} = M^*_L + M_{AR} + M^*_{LR} \quad (35)$$

wherein:

$M^*_L$ = the load moment calculated for the drive shaft via the transmission
$M_{AR}$ = the friction moments on the driving side
$M^*_{LR}$ = the load-side friction moments calculated for the drive shaft.

A conversion of the differential equation with regard to the driven shaft results in the following relationship $$k_3 \phi I_A = M_{W,ges} + \theta_{L,ges} \frac{\partial \omega_L}{\partial t} \quad (36)$$

with $$M_{W,ges} = \ddot{u} \cdot M^*_{W,ges} = M_L + \ddot{u} \cdot M_{AR} + M_{LR} \quad (37)$$

When this differential equation is integrated over a period of time T, which is not yet specified in detail, the following relationship is first obtained:

$$\int_{t_0}^{t_0+T} k_3 \phi I_A(t) dt = \int_{t_0}^{t_0+T} M_{W,ges}(t) dt + \int_{t_0}^{t_0+T} \theta_{L,ges} \frac{\partial \omega_L(t)}{\partial t} dt \quad (38)$$

The left-hand integral of equation (38) can now be dealt with in the manner described hereinbelow.

By introducing points of division $x_i$ with $i=0.1 \ldots n$ and $t_0 = x_0 < x_1 \ldots < x_n = t_0+T$, the interval $[t_0, t_0+T]$ can be divided into subintervals and the integral can be approximated to according to the following equation:

$$\int_{t_0}^{t_0+T} k_3 \phi I_A(t) dt \approx \sum_{i=1}^{n} k_3 \phi I_A(\tau_i) \cdot [x_i - x_{i-1}] \quad (39)$$

with $x_{i-1} < \tau_i < x_i$

In the case of an equidistant division of the interval $[t_0, t_0+T]$, the following relationship holds true:

$$x_i - x_{i-1} = \frac{T}{n} \quad i = 1, \ldots, n$$

Assuming this as a precondition, the relationship according to equation (39) can be written in simplified form as:

$$\int_{t_0}^{t_0+T} k_3 \phi I_A(t) dt = k_3 \phi T \cdot \frac{1}{n} \sum_{i=1}^{n} I_A(\tau_i) \quad (40)$$

At this point, reference is made to the fact that the term $(1/n)\Sigma I_A(\tau_i)$ corresponds to the arithmetic mean for an n-tupel of sampling values of the armature current $I_A$.

Furthermore, it can be stated the right-hand side of equation (40) converges for $n \to \infty$ towards the value of the integral and that the higher the value chosen for n is, the lower the error resulting from the approximation will normally be.

Taking these considerations as a basis, equation (38) can finally be written in simplified form as follows:

$$k_3 \phi T \cdot \frac{1}{n} \sum_{i=1}^{n} I_A(\tau_i) = \overline{M_{W,ges}} T + \theta_{L,ges} \cdot [\omega_L(t_0 + T) - \omega_L(t_0)] \quad (41)$$

with $$\overline{M_{W,ges}} = \frac{1}{T} \int_{t_0}^{t_0+T} M_{W,ges}(t) dt \quad (42)$$

According to equation (42), the quantity $M_{W,ges}$ describes the mean value of the resistance moment for the interval $[t_0, t_0+T]$.

By means of a simple reformulation of equation (41), the mean resistance moment for the interval $[t_0, t_0+T]$ can be determined approximately according to equation (43).

$$\overline{M_{W,ges}} \approx k_3\phi \cdot \frac{1}{n}\sum_{i=1}^{n} I_A(\tau_i) - \theta_{L,ges} \cdot \frac{\omega_L(t_0+T) - \omega_L(t_0)}{T} \quad (43)$$

For a determination of the mean resistance moment according to the relationship derived from equation (43), it will suffice to detect the state variables, angular velocity and armature current by suitable measurement procedures and to know, in addition, the mass moment of inertia acting on the direct-current drive, and the motor constant.

It follows that, in accordance with a preferred embodiment of the method according to the present invention, two state variables of the direct-current drive are first detected and, subsequently, the resistance moment applied to the direct-current drive is determined on the basis of the state variables detected and on the basis of parameters of the direct-current drive and of an element driven by the direct-current drive. The state variables preferably comprise the angular velocity and the armature current of the direct-current drive, and the parameters comprise the mass moment of inertia of the element driven by the direct-current drive and the motor constant of the direct-current drive itself. The parameters required for determining the resistance moment are determined during a learning operation of the undisturbed direct-current drive and stored. In a similar manner, the predetermined resistance moment is determined during a learning operation of the undisturbed direct-current drive and stored.

According to a preferred embodiment of the present invention, the method according to the invention is used in a direct-current drive for driving a door. In this case, the abnormal situation is when the door meets with an obstacle on its path of movement and, when this abnormal situation has been detected, the direct-current drive is switched off and/or reversed.

Figure 2:
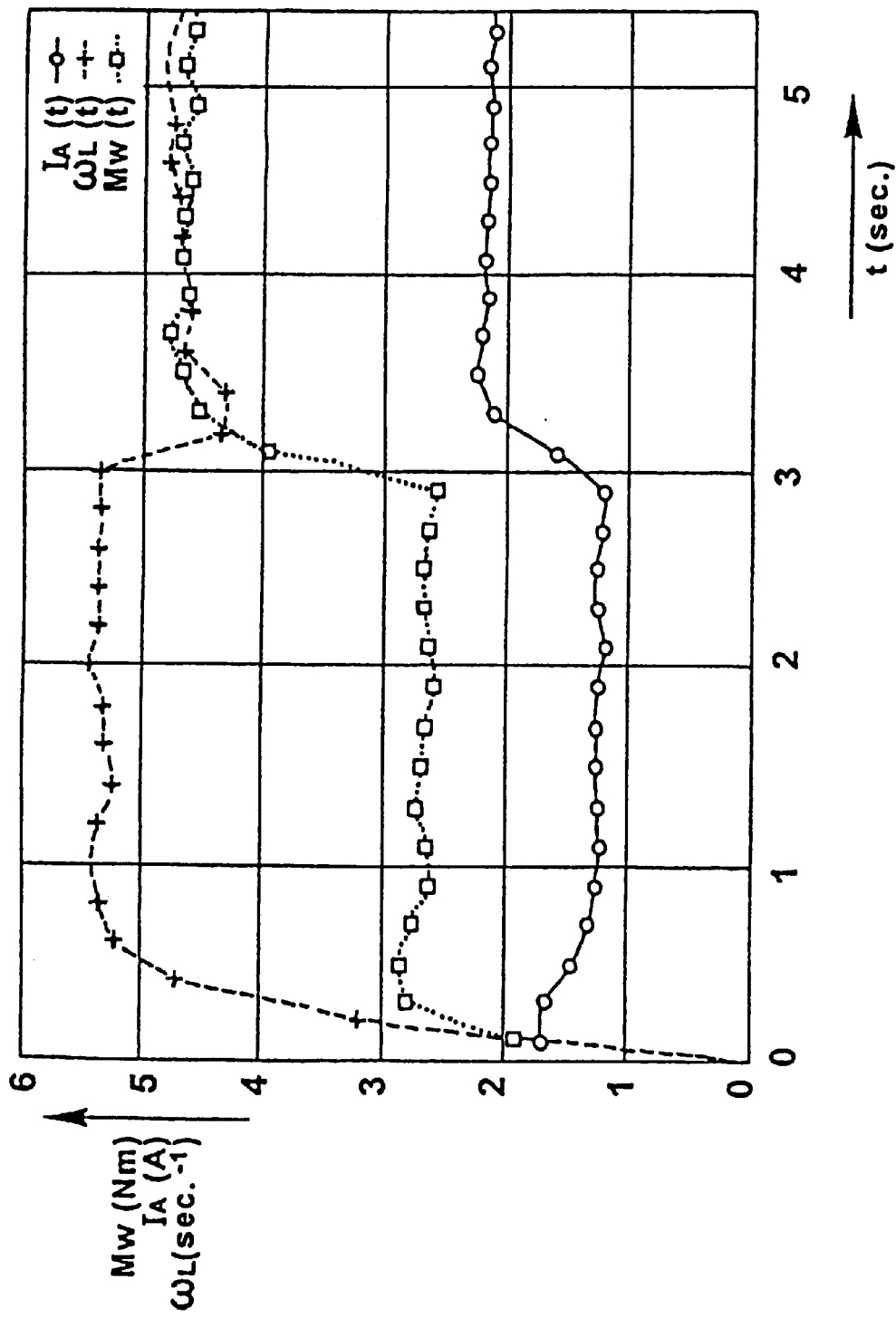
FIG. 2 shows a graph representing the motor current curve, the number of revolution curve and the load or resistance moment curve plotted against time in the case of a drive operating at constant speed.

Making reference to FIG. 2 to 4, the mode of operation of the method according to the present invention will be explained in detail hereinbelow. In accordance with the method according to the present invention, the occurrence of an abnormal situation or of a dangerous situation, e.g. obstruction or blocking of the driving motion, is recognized on the basis of the resultant increase in the resistance moment. For this purpose, the resistance moment, which is in reality position dependent, can be determined during an undisturbed trip an stored. The control according to the present invention is then carried out by comparing the reference resistance moments and the instantaneously determined resistance moment.

The resistance moment detected at the drive is normally composed of the following three submoments:
load moment
load-side friction
friction on the driving side (motor and transmission).

By means of suitable evaluation, the present invention also permits a compensation of the friction influences, which would interfere with a supervision of the load moment in its pure form.

A constant friction or a position-dependent friction (on the driven side) is not critical for the function of the method, since the force occurring due to the friction can be determined during the learning trip and added to the target load moment, or is included in the target load moment.

If the friction occurring (on the driving side as well as on the driven side) is speed-dependent, trips can be carried out at different speeds. The values determined in the course of these trips are filed in a table and, subsequently, they are deducted from the determined load moment according to the instantaneous speed for the purpose of correction.

On the basis of FIG. 2 and 3, a short description of the mode of operation of the method according to the present invention is given in the following. The graphs shown in FIGS. 2 and 3 were determined by means of an arrangement in which a direct-current motor lifts a weight. The dangerous situation was simulated in that the weight was abruptly increased during the lifting operation. In each of the figures, the motor current, the number of revolutions and the determined resistance moment are plotted against time. In FIG. 2, a jump at the time t=2.8 s can be seen, at which a load increase of 86 N took place. Also the current curve in FIG. 2 shows the starting current, which is almost fully compensated for in the calculation of the load moment. The curves plotted in FIG. 2 were detected in the case of a drive operating at constant speed.

Figure 3:
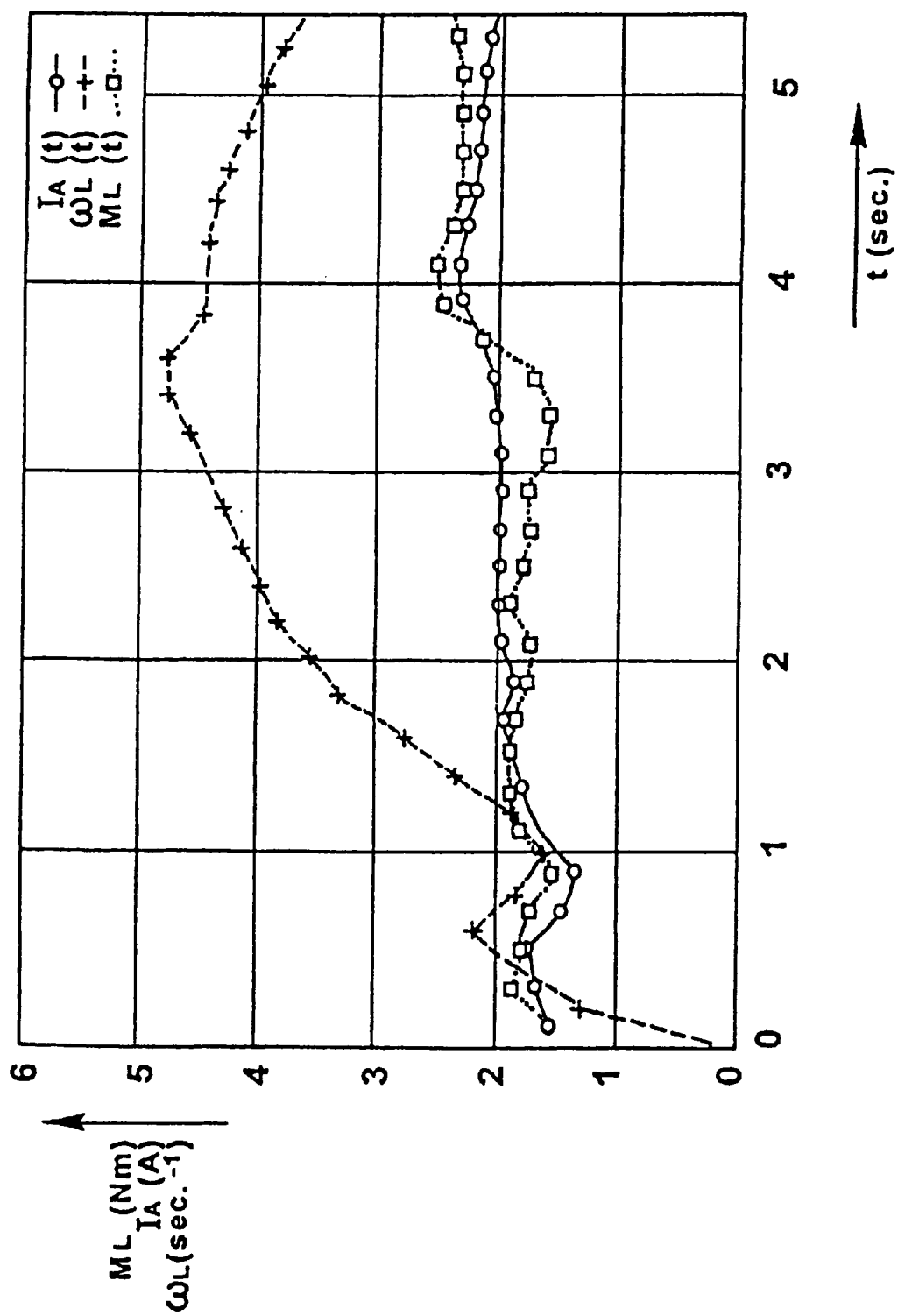
FIG. 3 shows a graph representing the motor current curve, the number of revolution curve and the load or resistance moment curve plotted against time in the case of a drive operating at variable speed.

In FIG. 3, the curves of the motor current, the load moment and the rotational speed are plotted against time; in this case, the direct-current drive was not operated at a constant speed. As can clearly be seen from FIG. 3, the compensation of the starting current also works at non-constant speeds. At the time t=3.5 s, the load was increased by 40 N. The change in the load moment is clearly visible, whereas the motor current is also subjected to strong variations by the acceleration and deceleration processes.

Figure 4:
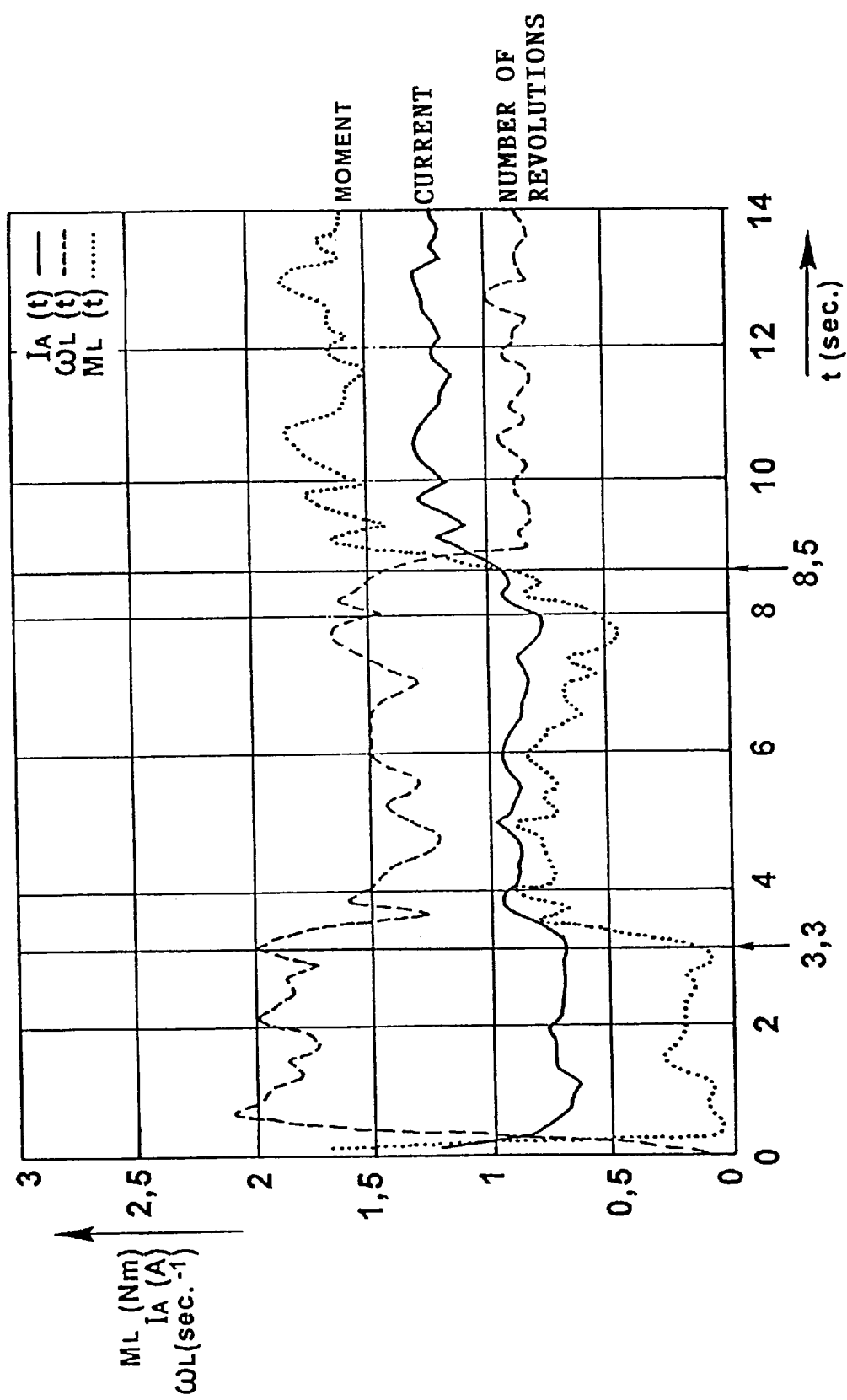
FIG. 4 shows a graph representing the measurement of the motor current, the motor speed and the load or resistance moment for measurements at a garage-door drive with an abrupt increase in the load or resistance moment.
Figure 5:
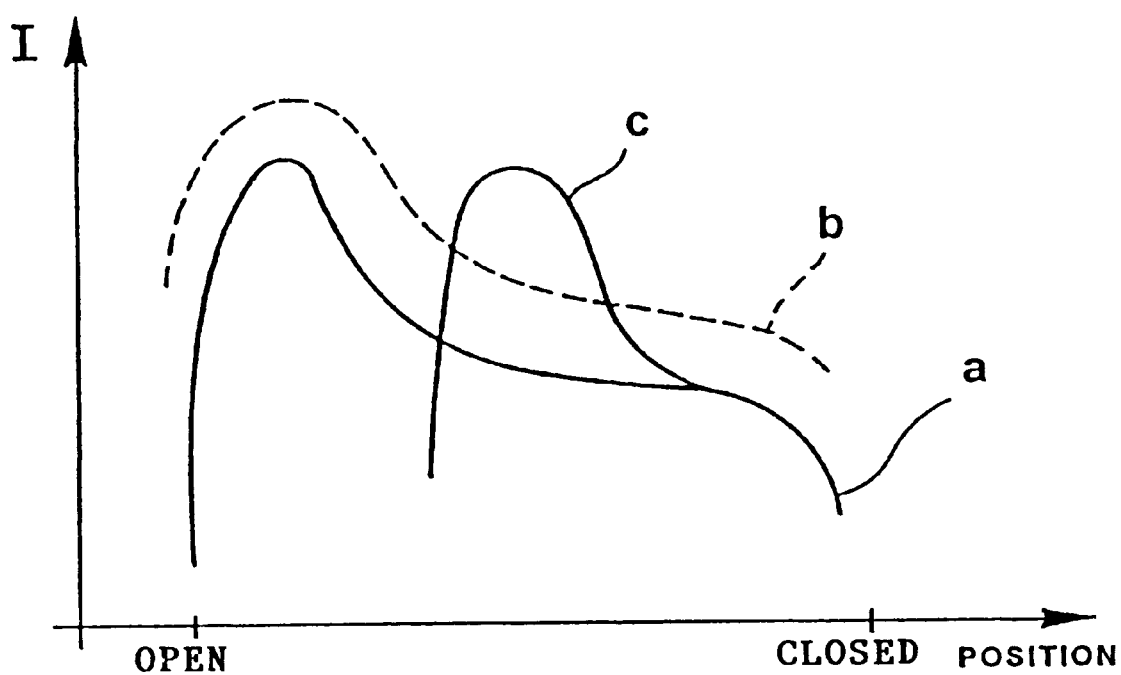
FIG. 5 shows the motor current curve obtained during a normal trip and when the door is re-started after having been stopped between the end positions according to a method known from the prior art.

In FIG. 4, the variables plotted against time are the motor current, the number of revolutions and the load moment, which were detected during operation of a garage-door drive with an abrupt increase in the load moment. At the times t=3.3 s and T=8.5 s, the door edge is acted upon by additional forces of 50 N in each case. These additional forces are clearly visible in the curve of the calculated load moment $M_L(t)$. As can clearly be seen in FIG. 4, the curve of the load moment shows marked jumps at the times in question so that it can clearly be seen from FIG. 4 that the calculation of the load moment permits a much more precise detection of a change of load as would, for example, be possible by supervising the current, as can easily be seen from the curve of the motor current $I_A(t)$.

It is pointed out that the method according to the present invention is suitable for all types of direct-current drives in the case of which the detection of an increase in load is required for avoiding abnormal situations.

What is claimed is:

1. A method of controlling a direct-current driver in particular a direct-current door drive, comprising the following steps:

a) detecting two state variables of the direct-current drive;

b) determining a load or resistance moment applied to the direct-current drive on the basis of the state variables detected in step a) and on the basis of parameters of the direct-current drive and of an element driven by said direct-current drive;

c) comparing the load or resistance moment determined with a predetermined load or resistance moment; and d) determining an abnormal situation when the load or resistance moment determined exceeds the predetermined load or resistance moment;

the load or resistance moment being determined according the following equation:

$$\overline{M_{W,ges}} \approx k_3\phi \cdot \frac{1}{n}\sum_{i=1}^{n} I_A(\tau_i) - \theta_{L,ges} \cdot \frac{\omega_L(t_0+T) - \omega_L(t_0)}{T}$$

wherein:

$M_{W,ges}$ .... mean load or resistance moment,
$k_3\theta$ ....... motor constant,
$I_A$ ........ armature current,
$\theta_{L,ges}$ .... mass moment of inertia, and
$\omega_L$ ........ angular velocity.

2. A method of controlling a direct-current drive, in particular a direct-current door drive, comprising the following steps:
   a) detecting two state variables of the direct-current drive;
   b) determining a load or resistance moment applied to the direct-current drive on the basis of the state variables detected in step a) and on the basis of parameters of the direct-current drive and of an element driven by said direct-current drive;
   c) comparing the load or resistance moment determined with a predetermined load or resistance moment; and
   d) determining an abnormal situation when the load or resistance moment determined exceeds the predetermined load or resistance moment;
   the load or resistance moment being determined by solving the following differential equations:

$$k_2\phi I_A = M^*_{W,ges} + \theta_{A,ges}\frac{\partial \omega_A}{\partial t}$$

$$U_A = R_A I_A + k_2\phi\omega_A + L_A\frac{\partial I_A}{\partial t}$$

wherein:

$I_A$ ......... armature current,
$U_A$ ......... armature voltage,
$R_A$ ......... armature resistance,
$L_A$ ......... armature inductance,
$\omega_A$ ......... angular velocity,
$\theta_{A,ges}$ ..... mass moment of inertia,
$M^*_{W,ges}$ .... resistance moment,
$\Phi$ .......... magnetic flux of a single pole through the coils,
$k_3\Phi$ ........ motor constant,
$k_2\Phi I_A = M_I$ .. inner torque.

3. A method according to claim 1, wherein the parameters of the direct-current drive and of the element driven by the direct-current drive are determined and stored during a learning operation of the undisturbed direct-current drive.

4. A method according to claim 1, comprising the following step:
   e) switching off and/or reversing the direct-current drive when an abnormal situation is detected in step d).

5. A method according to claim 1, wherein, in the case of a direct-current drive, the abnormal situation is when the door meets with an obstacle on its path of movement.

6. A method according to claim 1, wherein the predetermined load or resistance moment is determined and stored during a learning operation of the undisturbed direct-current drive.

7. A method according to claim 2, wherein the parameters of the direct-current drive and of the element driven by the direct-current drive are determined and stored during a learning operation of the undisturbed direct-current drive.

8. A method according to claim 2, comprising the following step:
   e) switching off and/or reversing the direct-current drive when an abnormal situation is detected in step d).

9. A method according to claim 2, wherein, in the case of a direct-current drive, the abnormal situation is when the door meets with an obstacle on its path of movement.

10. A method according to claim 2, wherein the predetermined load or resistance moment is determined and stored during a learning operation of the undisturbed direct-current drive.

* * * * *

UNITED STATES PATENT AND TRADEMARK OFFICE
CERTIFICATE OF CORRECTION

PATENT NO. : 6,005,361
DATED : December 21, 1999
INVENTOR(S) : Viktor Grinewitschus, Wesel; Dirk Raffel. Duisburg, both of Germany It is certified that error appears in the above-identified patent and that said Letters Patent is hereby corrected as shown below:

<u>On the cover page of the Patent:</u>

In Item [73], change Fóderung to -- Förderung --

Signed and Sealed this

Nineteenth Day of September, 2000

Attest:

Q. TODD DICKINSON

*Attesting Officer*      *Director of Patents and Trademarks*